US 12,115,955 B2

(12) United States Patent
Niazi

(10) Patent No.: US 12,115,955 B2
(45) Date of Patent: Oct. 15, 2024

(54) AIR/OXYGEN BRAKE FOR VEHICLES

(71) Applicant: Alireza Niazi, Ivar (IR)

(72) Inventor: Alireza Niazi, Ivar (IR)

(*) Notice: Subject to any disclaimer, the term of this patent is extended or adjusted under 35 U.S.C. 154(b) by 10 days.

(21) Appl. No.: 18/487,048

(22) Filed: Oct. 14, 2023

(65) Prior Publication Data
US 2024/0051508 A1 Feb. 15, 2024

Related U.S. Application Data

(63) Continuation-in-part of application No. PCT/IB2022/050843, filed on Feb. 1, 2022.

(60) Provisional application No. 63/174,568, filed on Apr. 14, 2021.

(51) Int. Cl.
| | |
|---|---|
| *B60T 13/68* | (2006.01) |
| *B60L 50/00* | (2019.01) |
| *B60T 1/06* | (2006.01) |
| *B60T 13/36* | (2006.01) |

(52) U.S. Cl.
CPC .......... *B60T 13/683* (2013.01); *B60L 50/00* (2019.02); *B60T 1/062* (2013.01); *B60T 13/36* (2013.01)

(58) Field of Classification Search
CPC ........ B60T 13/683; B60T 1/062; B60T 13/63; B60L 50/00
USPC ....................................................... 192/221
See application file for complete search history.

(56) References Cited

U.S. PATENT DOCUMENTS

| | | | | |
|---|---|---|---|---|
| 3,580,559 A | * | 5/1971 | Spieth ...................... | A47B 9/10 267/126 |
| 3,585,796 A | * | 6/1971 | Lewis ...................... | F01D 9/04 60/791 |
| 4,088,063 A | * | 5/1978 | Sheppard ................. | B62D 5/24 92/127 |
| 4,515,065 A | * | 5/1985 | Hannmann, Jr. ......... | F15B 9/03 92/131 |
| 4,854,218 A | * | 8/1989 | Stoll ....................... | F15B 15/28 91/1 |
| 4,953,416 A | * | 9/1990 | Komatsu .................. | B62D 5/12 91/375 A |
| 2012/0211681 A1 | * | 8/2012 | Wang .................. | F16K 31/1635 251/30.01 |
| 2017/0122454 A1 | * | 5/2017 | Baza Vazquez ...... | F16K 31/047 |

* cited by examiner

*Primary Examiner* — Colby M Hansen
(74) *Attorney, Agent, or Firm* — Bajwa IP Law Firm; Haris Zaheer Bajwa

(57) ABSTRACT

A braking system may include an enclosed cylinder and a double-sided piston assembly disposed therein. The double-sided piston assembly includes a first piston disposed within the enclosed cylinder, a second piston disposed within the enclosed cylinder, and a linear piston leg connecting the first piston and the second piston. The linear piston leg includes two opposite racks. A segmented pinion is disposed between the two opposite racks, where the segmented pinion includes a cogged segment and a cogless segment. The cogged segment and the cogless segment are on opposite sides of the segmented pinion. A brake shaft is connected to and rotatable with the segmented pinion. A transmission system is configured to couple the brake shaft to a drive shaft of a vehicle. Compressed air or oxygen may be drawn in or discharged from the enclosed cylinder via a one-way inlet valve and a one-way outlet valve.

20 Claims, 8 Drawing Sheets

AIR/OXYGEN BRAKE FOR VEHICLES

CROSS-REFERENCE TO RELATED APPLICATION

This application is a continuation-in-part of PCT/IB2022/050843 filed on Feb. 1, 2022, and entitled "AIR/OXYGEN BRAKE FOR VEHICLES" which claims the benefit of priority from U.S. Provisional Patent Application Ser. No. 63/174,568, filed on Apr. 14, 2021, and entitled "OXYGEN BRAKE," which are both incorporated herein by reference in their entirety.

TECHNICAL FIELD

The present disclosure generally relates to braking systems, and particularly relates to braking systems for vehicles. The present disclosure, more particularly, relates to a braking system that utilizes oxygen.

BACKGROUND

Braking systems in vehicles are utilized for slowing down or stopping a vehicle, and sometimes, in case of electrical vehicles, for generating electricity and charging the batteries. A braking system may include a brake lining and a brake disk. Materials that are used for fabricating brake linings and brake discs are different in various vehicles. However, common braking systems are associated with similar problems such as high weight, disc warping, disc braking, noise, and environmental pollution due to the hazardous materials of construction. Another major issue, especially in case of electric and hybrid vehicles is energy waste in a braking system. There is, therefore, a need for a braking system that may address the abovementioned issues.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description and the drawings.

According to one or more exemplary embodiments, the present disclosure is directed to a braking system. An exemplary system may include an enclosed cylinder and a double-sided piston assembly disposed within an exemplary enclosed cylinder. An exemplary double-sided piston assembly may include a first piston disposed within an exemplary enclosed cylinder, a second piston disposed within an exemplary enclosed cylinder, and a linear piston leg connected between and moveable with an exemplary first piston and an exemplary second piston. An exemplary linear piston leg may include two opposite racks. An exemplary double-sided piston assembly may be configured to divide an inner volume of an exemplary enclosed cylinder into a first chamber and a second chamber.

An exemplary system may further include a segmented pinion that may be disposed between two exemplary opposite racks, where an exemplary segmented pinion may include a cogged segment and a cogless segment. An exemplary cogged segment and an exemplary cogless segment may be on opposite sides of an exemplary segmented pinion.

An exemplary system may further include a brake shaft that may be connected to and rotatable with an exemplary segmented pinion.

An exemplary system may further include a one-way outlet line that may be connected in fluid communication with an exemplary first chamber and an exemplary second chamber, where an exemplary one-way outlet line may be configured to allow discharging a fluid out of an exemplary first chamber and an exemplary second chamber. An exemplary system may further include a one-way inlet line that may be connected in fluid communication with an exemplary first chamber and an exemplary second chamber, where an exemplary one-way inlet line may be configured to allow introducing a fluid into an exemplary first chamber and an exemplary second chamber.

An exemplary system may further include a transmission system that may be configured to couple an exemplary brake shaft to a drive shaft of a vehicle. An exemplary drive shaft of an exemplary vehicle may be configured to drive a rotational motion of an exemplary brake shaft. The rotational motion of an exemplary drive shaft may be transferred to an exemplary brake shaft via an exemplary transmission system.

Two exemplary opposite racks may be extended along an exemplary longitudinal axis of an exemplary enclosed cylinder, where two exemplary opposite racks may be laterally spaced apart. An exemplary cogged segment of an exemplary segmented pinion may be configured to mesh with only of two exemplary opposite racks at a time responsive to rotational motion of an exemplary segmented pinion.

An exemplary segmented pinion may be mounted between two exemplary opposite racks such that an exemplary cogged segment of an exemplary segmented pinion may be meshed with one of two exemplary opposite racks and an exemplary cogless segment of an exemplary segmented pinion may face an opposing one of two exemplary opposite racks during a half turn of an exemplary segmented pinion.

An exemplary enclosed cylinder may include a lateral hole on a wall of an exemplary enclosed cylinder, where an exemplary lateral hole may be fitted with a bearing that may be rotatably coupled to an exemplary brake shaft. An exemplary bearing may be configured to allow an exemplary brake shaft to rotatably pass through an exemplary lateral hole and enter an exemplary inner volume of an exemplary enclosed cylinder.

An exemplary enclosed cylinder may further include a first inlet port that may be fitted with a first one-way inlet valve. An exemplary first inlet port may be in fluid communication with an exemplary first chamber. An exemplary enclosed cylinder may further include a second inlet port that may be fitted with a second one-way inlet valve, where an exemplary second inlet port may be in fluid communication with an exemplary second chamber. An exemplary one-way inlet line may further be connected in fluid communication with an exemplary first inlet port and an exemplary second inlet port.

An exemplary one-way inlet line may be connected to a fluid source from one end of an exemplary one-way inlet line, and an exemplary one-way inlet line may further be connected to an exemplary first inlet port and an exemplary second inlet port from an opposing end of an exemplary one-way inlet line.

An exemplary enclosed cylinder may further include a first outlet port that may be fitted with a first one-way outlet valve, where an exemplary first outlet port may be in fluid communication with an exemplary first chamber. An exemplary enclosed cylinder may further include a second outlet port that may be fitted with a second one-way outlet valve, where the second outlet port may be in fluid communication with an exemplary second chamber. An exemplary one-way outlet line may further be connected in fluid communication with an exemplary first outlet port and an exemplary second outlet port.

An exemplary enclosed cylinder may further include a first pressurized fluid inlet that may be connected in fluid communication with an exemplary first chamber, where an exemplary first pressurized fluid chamber may further be connected to a pressurized fluid source. An exemplary enclosed cylinder may further include a second pressurized fluid inlet that may be connected in fluid communication with an exemplary second chamber, where an exemplary second pressurized fluid inlet may further be connected to an exemplary pressurized fluid source.

An exemplary pressurized fluid source may include a fluid pressurizing mechanism that may be connected to a fluid source, where an exemplary fluid pressurizing mechanism may include at least one of a fluid pump and a gas compressor.

An exemplary system may further include a controller that may be connected in signal communication to an exemplary first one-way outlet valve, an exemplary second one-way outlet valve, and an exemplary fluid pressurizing mechanism. An exemplary controller, in response to receiving a brake activating signal, may be configured to urge an exemplary first one-way outlet valve and an exemplary second one-way outlet valve to be closed and to urge an exemplary fluid pressurizing mechanism to introduce an exemplary pressurized fluid into an exemplary first chamber and an exemplary second chamber via an exemplary first pressurized fluid inlet and an exemplary second pressurized fluid inlet.

BRIEF DESCRIPTION OF THE DRAWINGS

The novel features which are believed to be characteristic of the present disclosure, as to its structure, organization, use and method of operation, together with further objectives and advantages thereof, will be better understood from the following drawings in which a presently exemplary embodiment of the present disclosure will now be illustrated by way of example. It is expressly understood, however, that the drawings are for illustration and description only and are not intended as a definition of the limits of the present disclosure. Embodiments of the present disclosure will now be described by way of example in association with the accompanying drawings in which.

DETAILED DESCRIPTION

The novel features which are believed to be characteristic of the present disclosure, as o its structure, organization, use and method of operation, together with further objectives and advantages thereof, will be better understood from the following discussion.

The present disclosure is directed to exemplary embodiments of a braking system that may be mounted between a drive shaft and a wheel of a vehicle. An exemplary braking system may utilize fluid pressure to actuate a braking force that may be exerted on an exemplary drive shaft of an exemplary vehicle. An exemplary braking system may include a reciprocating cylinder-piston mechanism. The reciprocating cylinder-piston mechanism may be connected to an exemplary drive shaft of an exemplary vehicle. The reciprocating cylinder-piston mechanism may be connected to a drive shaft by using a brake shaft via a transmission system. An exemplary drive shaft of an exemplary vehicle may drive a reciprocating motion of a cylinder-piston mechanism via an exemplary brake shaft. In practice, to apply brake force onto an exemplary drive shaft, an exemplary braking system may allow for increasing fluid pressure within an exemplary cylinder-piston mechanism, which in turn may stop an exemplary reciprocating motion of the cylinder-piston mechanism. Here, the stopping force applied onto an exemplary brake shaft due to the pressure increase within an exemplary cylinder-piston mechanism may be transferred to an exemplary drive shaft of a vehicle.

Figure 1:
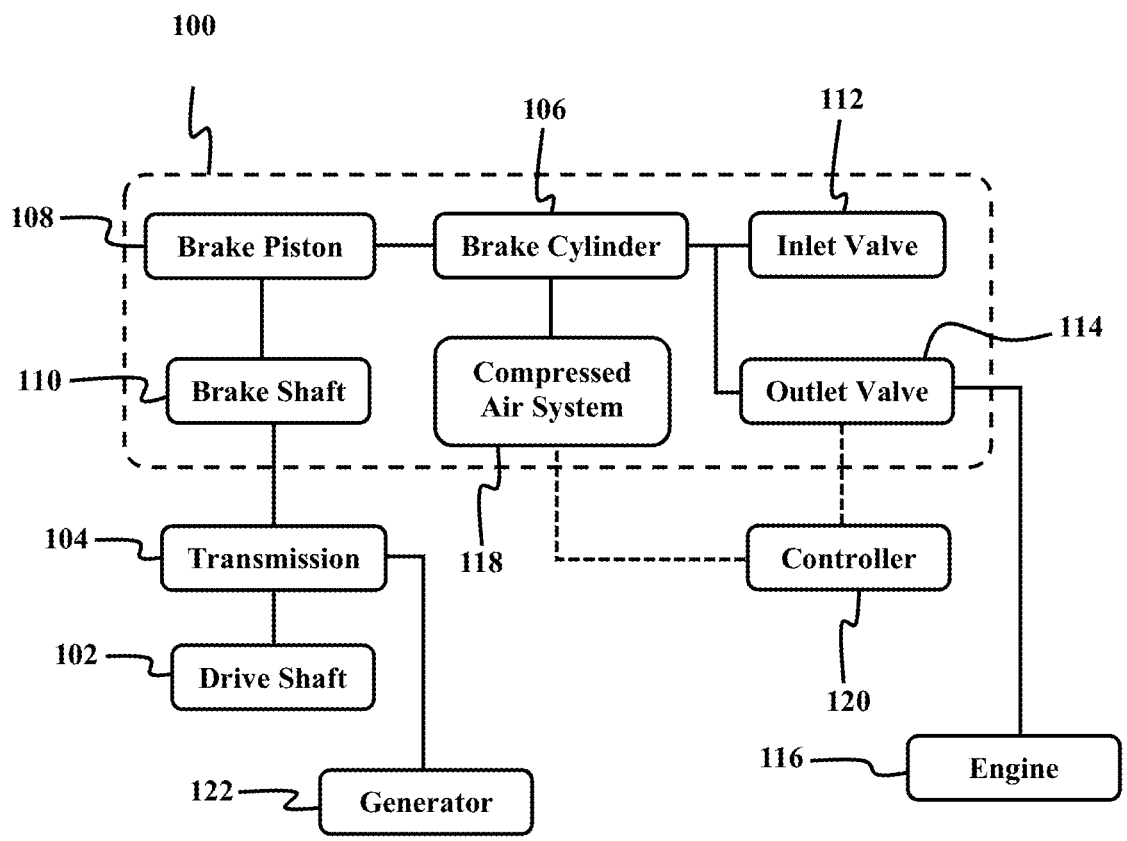
FIG. 1 illustrates a functional block diagram of a braking system coupled to a drive shaft via a transmission mechanism, consistent with one or more exemplary embodiments of the present disclosure.

FIG. 1 illustrates a functional block diagram of a braking system 100 coupled to a drive shaft 102 via a transmission mechanism 104, consistent with one or more exemplary embodiments of the present disclosure. In an exemplary embodiment, braking system 100 may include a brake cylinder 106 and a brake piston 108 moveably disposed within brake cylinder 106. In an exemplary embodiment, when brake piston 108 is moveably disposed within brake cylinder 106, it may mean that brake piston 108 is disposed within brake cylinder 106 in such a way that brake piston 108 is able to move within brake cylinder 106 along a main longitudinal axis of brake cylinder 106. In an exemplary embodiment, brake piston 108 may be coupled to a brake shaft 110 via a coupling mechanism that may allow for transforming the rotational movement of brake shaft 110 into reciprocating motion of brake piston 108. In an exemplary embodiment, brake shaft 110 may be coupled to drive shaft 102 of a vehicle via transmission mechanism 104. In an exemplary embodiment, drive shaft 102 may drive the rotational motion of brake shaft 110. In an exemplary embodiment, brake cylinder 106 may include an inlet valve 112 and an outlet valve 114 that each may be respective one-way control valves. In other words, inlet valve 112 may be a control valve that may only allow a fluid to be introduced into brake cylinder 106 and outlet valve 114 may be a control valve that may only allow a fluid to be discharged from brake cylinder 106.

In an exemplary scenario, under normal operations, both inlet valve 112 and outlet valve 114 are open and a fluid, such as air or oxygen may be drawn into brake cylinder 106 and then may be compressed out of brake cylinder 106 due to the reciprocating movement of brake piston 108 within brake cylinder 106. In an exemplary embodiment, normal operation may refer to a scenario in which braking does not occur. In an exemplary embodiment, for an internal combustion engine, outlet valve 114 may be connected in fluid communication with an internal combustion engine, such as engine 116 and air or oxygen compressed out of brake cylinder 106 may be sent into engine 116. In other words, under normal conditions, when braking does not occur, braking system 100 may function as a turbocharger and may inject compressed air or oxygen into engine 116.

In an exemplary embodiment, braking system 100 may further include a compressed air system 118 that may include an air compressor in fluid communication with an air reservoir. In an exemplary embodiment, compressed air system 118 may refer to a system that may provide compressed air. In exemplary embodiment, compressed air system 118 may be configured to and may be utilized to inject air into brake cylinder 106. To this end, compressed air system 118 may be connected in fluid communication with brake cylinder 106.

In an exemplary embodiment, braking system 100 may further include a controller 120 that may be connected in signal communication with outlet valve 114. In an exemplary embodiment, controller 120 may be configured to send control signals to outlet valve 114 to actuate opening/closing of outlet valve 114. When brake is to be applied, controller 120 may send a closing signal to outlet valve 114, and consequently, outlet valve 114 may be closed thereby not allowing any fluid discharge from brake cylinder 106. In an exemplary embodiment, controller 120 may further be connected in signal communication with compressed air system 118 and upon applying the brake, controller 120 may urge compressed air system 118 to inject compressed air into brake cylinder 106. In other words, when brake is applied, outlet valve 114 may be closed and compressed air may be injected into brake cylinder 106 increasing the internal pressure of brake cylinder 106. Such increase in the internal pressure of brake cylinder may make reciprocating movement of brake piston 108 more and more difficult. As a result, it may become more and more difficult for brake shaft 110 to continue its rotational movement against the pressure exerted on brake piston 108. In an exemplary embodiment, such hinderance or brake may be transferred to drive shaft 102 via transmission system 104.

As mentioned before, in an internal combustion engine, under normal conditions when the brake is not applied, braking system 100 may function as a supercharger sending compressed air or oxygen into engine 116. In an exemplary embodiment, normal conditions of a car may refer to a scenario in which the car is running and the brake is not applied. However, in an exemplary embodiment, in case of electric vehicles that do not need to be supercharged, under normal conditions, rotational movement of drive shaft 102 may be transferred via transmission system 104 to a generator 122 to generate electricity. In case of electric vehicles, when the brake is applied, transmission system 104 may reconnect drive shaft 102 to brake shaft 110.

Figure 2A:
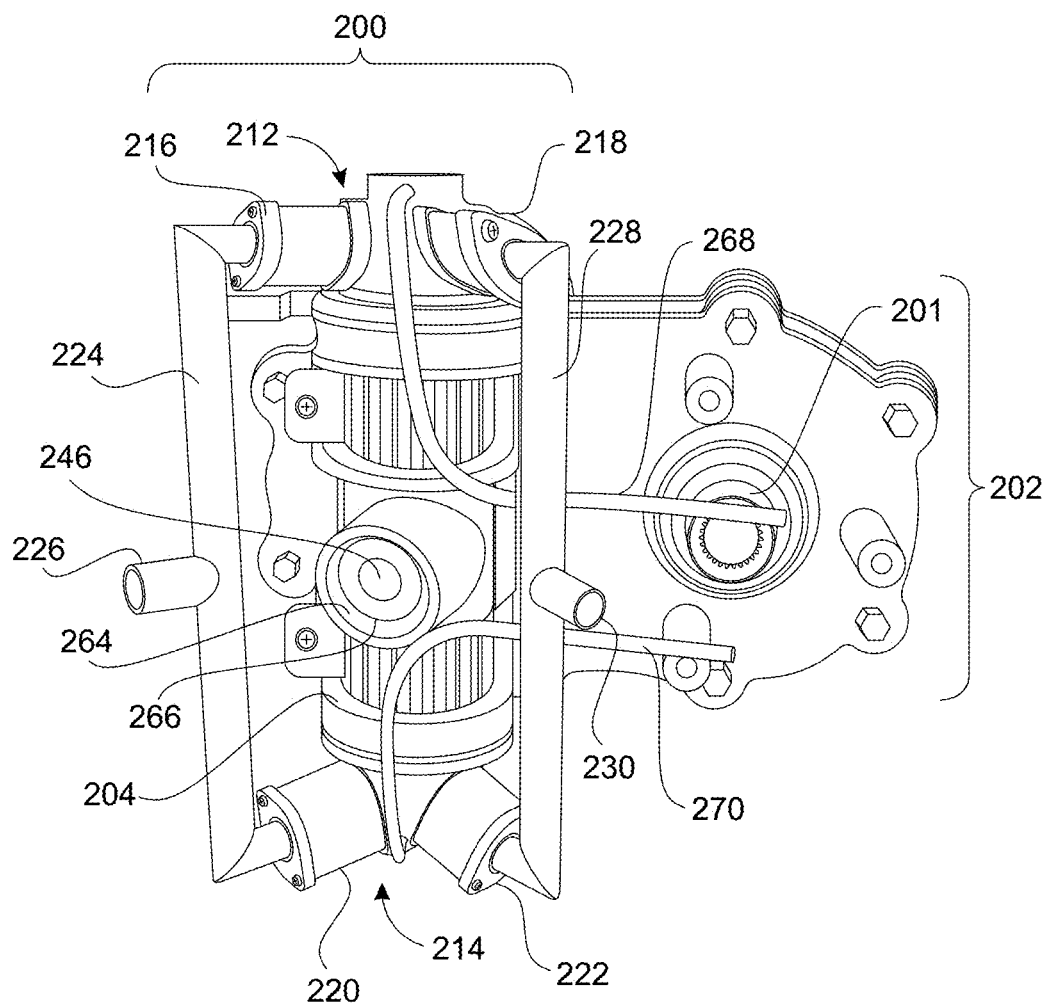
FIG. 2A illustrates a perspective view of a brake assembly coupled to a transmission system, consistent with one or more exemplary embodiments of the present disclosure.
Figure 2B:
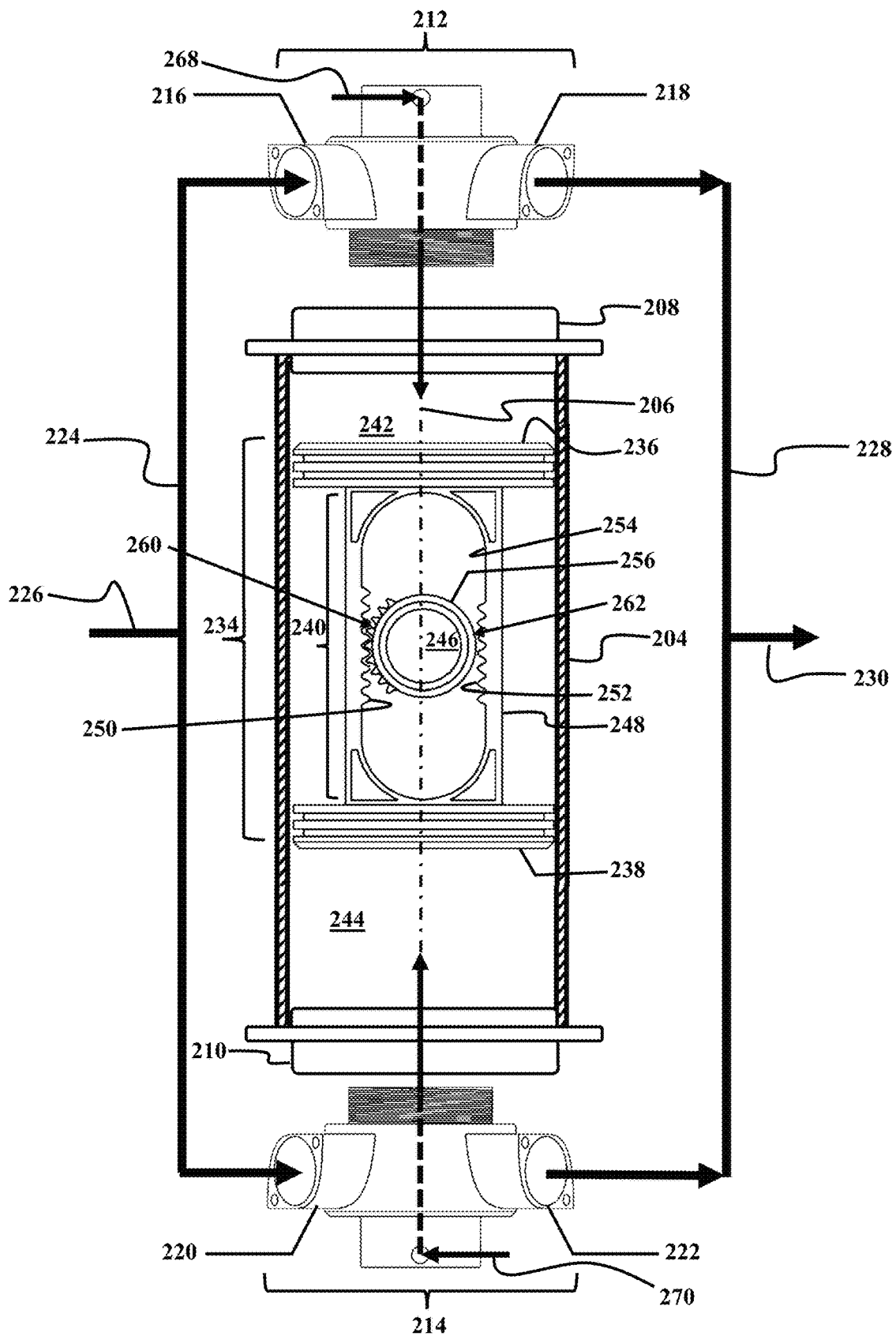
FIG. 2B illustrates a sectional schematic sideview of a brake assembly, consistent with one or more exemplary embodiments of the present disclosure.

FIG. 2A illustrates a perspective view of a brake assembly 200 coupled to a transmission system 202, consistent with one or more exemplary embodiments of the present disclosure. FIG. 2B illustrates a sectional schematic sideview of brake assembly 200, consistent with one or more exemplary embodiments of the present disclosure. In an exemplary embedment, brake assembly 200 may be similar to braking system 100 and may be installed between an exemplary drive shaft of an exemplary vehicle and an exemplary wheel of an exemplary vehicle. In an exemplary embodiment, brake assembly 200 may be connected to an exemplary drive shaft (not illustrated) similar to drive shaft 102 via transmission system 202 that may be similar to transmission system 104. In an exemplary embodiment, an exemplary drive shaft may be coupled to transmission system 202 by utilizing a coupling member 201.

In an exemplary embedment, brake assembly 200 may include a brake cylinder 204 similar to brake cylinder 106. In an exemplary embodiment, brake cylinder 204 may be an elongated enclosed cylinder that may extend along a longitudinal axis 206 of brake cylinder 204. In an exemplary embodiment, base ends of brake cylinder 204 may be sealed off by utilizing a first cap 208 and a second cap 210. In an exemplary embodiment, first cap 208 may include a threaded opening that may be configured to receive a corresponding first threaded valve assembly 212 that may be screwed on first cap 208. In an exemplary embodiment, internal threads of the threaded opening may correspond to external threads of first threaded valve assembly 212. In an exemplary embodiment, the internal threads of the threaded opening may be engaged with external threads of first threaded valve assembly 212 so that the threaded opening may receive first threaded valve assembly 212. In an exemplary embodiment, second cap 210 may include a threaded opening that may receive a corresponding second threaded valve assembly 214 that may be screwed on opposing second cap 210.

In an exemplary embodiment, first threaded valve assembly 212 may include a first inlet valve 216 and a first outlet valve 218. In an exemplary embodiment, first inlet valve 216 and first outlet valve 218 may become in fluid communication with an inner volume of brake cylinder 204 responsive to first threaded valve assembly 212 being screwed on first cap 208. In an exemplary embodiment, second threaded valve assembly 214 may include a second inlet valve 220 and a second outlet valve 222. In an exemplary embodiment, second inlet valve 220 and second outlet valve 222 may become in fluid communication with an inner volume of brake cylinder 204 responsive to second threaded valve assembly 214 being screwed on second cap 210.

In an exemplary embodiment, first inlet valve 216 and second inlet valve 220 may be structurally similar to inlet valve 112 and may include one-way control valves, such as one-way solenoid valves. In an exemplary embodiment, first outlet valve 218 and second outlet valve 222 may be structurally and functionally similar to outlet valve 114 and may include one-way control valves, such as one-way solenoid valves. In an exemplary embodiment, first inlet valve 216 and second inlet valve 220 may be connected in fluid communication by utilizing a tube 224 with a tee connection in the middle forming a one-way inlet line 226. In an exemplary embodiment, first outlet valve 218 and second outlet valve 222 may be connected in fluid communication by utilizing a tube 228 with a tee connection in the middle forming a one-way outlet line 230. In an exemplary embodiment, one-way inlet line 226 may be connected in fluid communication to ambient or a fluid source such as an air source or an oxygen source. In an exemplary embodiment, one-way outlet line 230 may be connected in fluid communication to an internal combustion engine such as engine 116 to send pressurized air or oxygen into an exemplary internal combustion engine. In an exemplary embodiment, one-way outlet line 230 may be connected in fluid communication with a fluid source, such as air or oxygen source, where pressurized air or oxygen may be sent by utilizing one-way outlet line 230 into an exemplary pressurized air or oxygen source to be used later.

In an exemplary embodiment, brake assembly 200 may further include a brake piston assembly 232 similar to brake piston 108. In an exemplary embodiment, brake piston assembly 232 may include a double-piston assembly or a double-sided piston with two parallel pistons, namely, first piston 236 and second piston 238 interconnected by utilizing an elongated linear piston leg 240. In an exemplary embodiment, first piston 236 and second piston 238 may be similar to each other structurally and functionally. In an exemplary embodiment, first piston 236 and second piston 238 may include cylindrical pistons, base ends of which may be parallel with each other. In an exemplary embodiment, elongated linear piston leg 240 may be disposed between first piston 236 and second piston 238 and may attach first piston 236 and second piston 238. In an exemplary embodiment, first piston 236 and second piston 238 may be moveable with each other along longitudinal axis 206. In an exemplary embodiment, brake piston assembly 232 may divide an internal volume of brake cylinder 204 into a first chamber 242 and a second chamber 244. As used herein, brake piston assembly 232 dividing the internal volume of brake cylinder 204 into first chamber 242 and second chamber 244 may refer to first piston 236 and second piston 238 completely sealing off first chamber 242 from second chamber 244.

In an exemplary embodiment, first inlet valve 216 and first outlet valve 218 may be connected in fluid communication with first chamber 242 and second inlet valve 220 and second outlet valve 222 may be connected in fluid communication with second chamber 244. As used herein, first chamber 242 and second chamber 244 may refer to portions of the internal volume of brake cylinder 204 which are separated from each other by brake piston assembly 232. In an exemplary embodiment, brake piston assembly 232 may move along longitudinal axis 206 of brake cylinder 204 similar to brake piston 108. Under normal conditions, when brake is not applied, as brake piston assembly 232 moves towards first cap 208, contents of first chamber 242 may be discharged via first outlet valve 218, while simultaneously, an exemplary fluid may be drawn into second chamber 244 via second inlet valve 220. Similarly, when brake piston assembly 232 moves towards second cap 210, contents of second chamber 244 may be discharged via second outlet valve 222 and an exemplary fluid may be drawn into first chamber 242 via first inlet valve 216. In an exemplary embodiment, such alternate drawing and discharging of fluid due to reciprocating movement of brake piston assembly 232 may allow for continuously drawing in fluid via one-way inlet line 226 and discharging fluid via one-way outlet line 230 under normal conditions, when brake is not applied.

In an exemplary embodiment, brake assembly 200 may further include a brake shaft 246 that may be coupled to brake piston assembly 232 such that rotational movement of brake shaft 246 may be transformed into reciprocating movement of brake piston assembly 232. To this end, in an exemplary embodiment, elongated linear piston leg 240 may include a frame 248 with two opposing linear cogged sections or racks (250, 252). In an exemplary embodiment, two opposing linear cogged sections or racks (250, 252) may refer to two linear cogged sections that are provided on opposite internal sides of frame 248. In an exemplary embodiment, opposing linear cogged sections (250, 252) may extend along longitudinal axis 206 and may be symmetrically spaced apart along an axis perpendicular to longitudinal axis 206. In an exemplary embodiment, frame 248 may further include an open pathway 254 formed due to the distance between opposing linear cogged sections (250, 252). In an exemplary embodiment, a linear cogged section may refer to a section that a plurality of teeth arranged in line on a linear part of an element. In an exemplary embodiment, each of linear cogged sections (250, 252) may be elongated along a respective axis that may be parallel to a main longitudinal axis of frame 248. In an exemplary embodiment, brake shaft 246 may be coupled to opposing linear cogged sections (250, 252) by utilizing a segmented pinion 256 mounted on brake shaft 246 and rotatable with brake shaft 246.

In an exemplary embodiment, segmented pinion 256 may include a cogged segment 260 on an outer periphery of segmented pinion 256 and a cogless segment 262 on an opposite side of the outer periphery of segmented pinion 256. In other words, cogged segment 260 may only cover one half of or less than one half of an external surface of segmented pinion 256. In an exemplary embodiment, such configuration of segmented pinion 256 may allow for segmented pinion 256 to mesh with only one of opposing linear cogged segments (250, 252) at a time. In an exemplary embodiment, as just a portion of segmented pinion 256 is covered by cogged segment 260, when segmented pinion 256 is engaged with linear cogged segment 250, it may not be engaged with linear cogged segment 252. Similarly, in an exemplary embodiment, when segmented pinion 256 is engaged with linear cogged segment 252, it may not be engaged with linear cogged segment 250. For example, segmented pinion 256 may either mesh with a first linear cogged section 250 of opposing linear cogged sections (250, 252) or a second linear cogged section 252 of opposing linear cogged sections (250, 252). In an exemplary embodiment, it may be understood that this may be due to the fact that only a portion of segmented pinion 256 has teeth and while cogged segment 260 of segmented pinion 256 is coupled to or meshed with one of opposing linear cogged segments (250, 252), cogless segment 262 of segmented pinion 256 may face the other one of opposing linear cogged segments (250, 252). In an exemplary embodiment, responsive to brake shaft 246 clockwise rotation, when cogged segment 260 meshes with first linear cogged section 250, brake piston assembly 232 may move towards first cap 208 and then as segmented pinion 256 continues its rotation, cogged segment 260 may become meshed with second linear cogged section 252 and this time rotational movement of segmented pinion 256 may urge brake piston assembly 232 to move towards second cap 210.

In an exemplary embodiment, brake cylinder 204 may further include a lateral central hole 264 that may be fitted with a bearing 266 that may be configured to allow for brake shaft 246 to extend out of brake cylinder 204 or otherwise be rotatably coupled with an outer wall of brake cylinder 204. In an exemplary embodiment, a bearing may refer to a mechanical part of a machine that may allow one part to rotate or move in contact with another part with a s little friction as possible. In an exemplary embodiment, bearing 266 may be placed inside lateral central hole 264. In an exemplary embodiment, brake shaft 246 may be disposed inside a central hole of bearing 266. In an exemplary embodiment, due to the presence of bearing 266, brake shaft 246 may move back and forth and also rotate inside central hole 264. In an exemplary embodiment, open pathway 254 of elongated linear piston leg 240 may allow for brake piston assembly 234 to move up and down around brake shaft 246.

In an exemplary embodiment, first threaded valve assembly 212 may further include a first pressurized fluid line 268. In an exemplary embodiment, first pressurized fluid line 268 may become connected in fluid communication with first chamber 242 responsive to first threaded valve assembly 212 being screwed on first cap 208. In an exemplary embodiment, first pressurized fluid line 268 may further be connected in fluid communication with a pressurized fluid source forming a compressed fluid system similar to compressed air system 118. In an exemplary embodiment, a pressurized fluid, such as pressurized air or pressurized oxygen may be injected into first chamber 242 via first pressurized fluid line 268. In an exemplary embodiment, second threaded valve assembly 214 may further include a second pressurized fluid line 270. In an exemplary embodiment, second pressurized fluid line 270 may become connected in fluid communication with second chamber 244 responsive to second threaded valve assembly 214 being screwed on second cap 210. In an exemplary embodiment, second pressurized fluid line 270 may further be connected in fluid communication with the pressurized fluid source forming the compressed fluid system similar to compressed air system 118. In an exemplary embodiment, a pressurized fluid, such as pressurized air or pressurized oxygen may be injected into second chamber 244 via second pressurized fluid line 270.

Figure 3A:
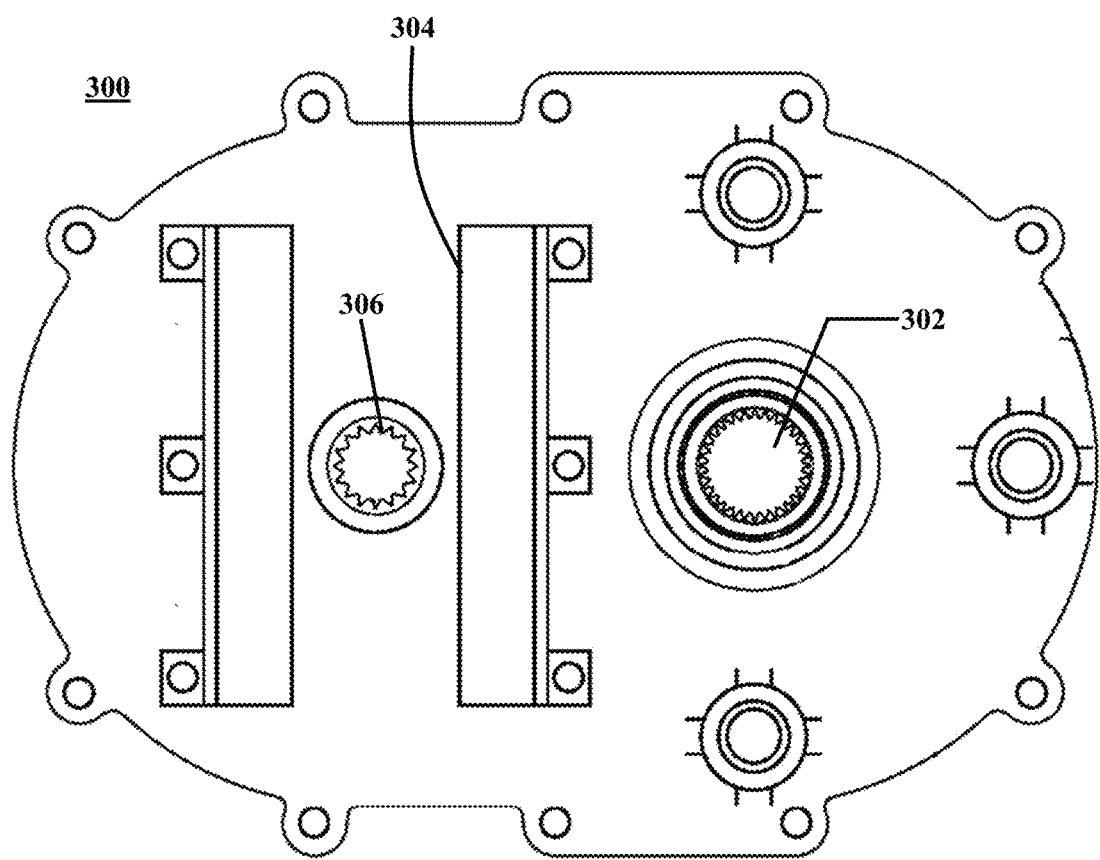
FIG. 3A illustrates a front view of a transmission assembly, consistent with one or more exemplary embodiments of the present disclosure.
Figure 3B:
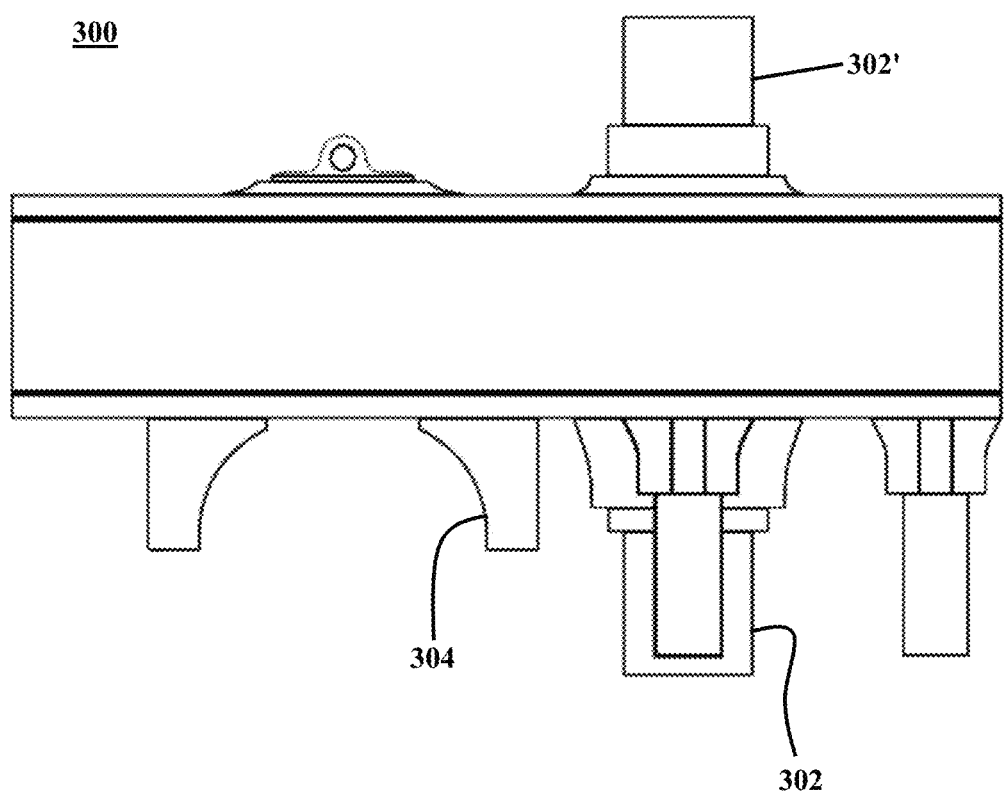
FIG. 3B illustrates a top view of a transmission assembly, consistent with one or more exemplary embodiments of the present disclosure.
Figure 3C:
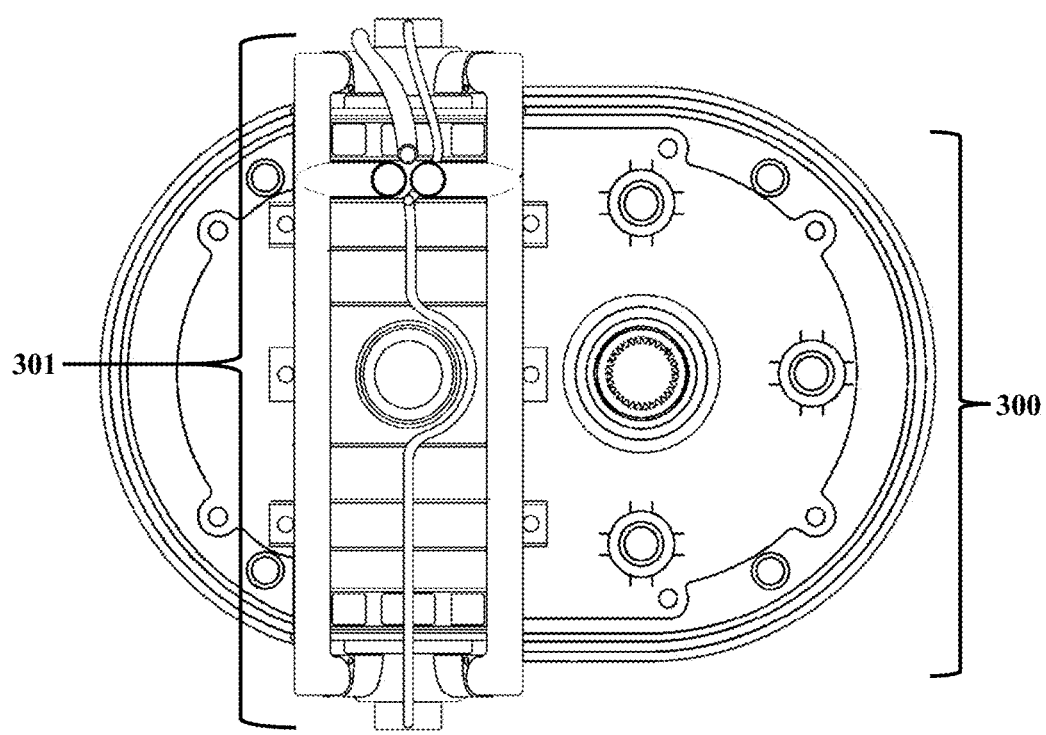
FIG. 3C illustrates a front view of a transmission assembly coupled to a brake assembly in a vehicle with an internal combustion engine, consistent with one or more exemplary embodiments of the present disclosure.

FIG. 3A illustrates a front view of a transmission assembly 300, consistent with one or more exemplary embodiments of the present disclosure. FIG. 3B illustrates a top view of transmission assembly 300, consistent with one or more exemplary embodiments of the present disclosure. FIG. 3C illustrates a front view of transmission assembly 300 coupled to a brake assembly 301 in a vehicle with an internal combustion engine, consistent with one or more exemplary embodiments of the present disclosure. In an exemplary embodiment, transmission assembly 300 may be structurally and functionally similar to transmission system 202 and may be coupled to brake assembly 301 that may be structurally and functionally similar to brake assembly 200. For simplicity, internal gears of transmission assembly 300 are not illustrated.

In an exemplary embodiment, transmission assembly 300 may include a drive gear (not illustrated) that may be coupled to a drive shaft 302, which may further extend (extended drive shaft 302') to the other side of transmission assembly 300 to be coupled to an exemplary wheel of an exemplary vehicle. In an exemplary embodiment, transmission assembly 300 may further include a mount 304 that may be configured to allow for an exemplary brake assembly similar to brake assembly 200 to be mounted on mount 304 as illustrated in FIG. 3C. In an exemplary embodiment, transmission assembly 300 may include a brake gear 306 that may be coupled to an exemplary brake shaft similar to brake shaft 246. In an exemplary embodiment, transmission assembly 300 may be configured to couple an exemplary brake shaft similar to brake shaft 246 to drive shaft 302. In an exemplary embodiment, transmission assembly 300 may include a gear system connected to the drive shaft 302. In an exemplary embodiment, the gear system may be interconnected between brake shaft 246 and drive shaft 302 and thereby, brake shaft 246 may be coupled to drive shaft 302.

In practice, brake assembly 200 may be coupled between drive shaft 201 and an exemplary wheel of an exemplary vehicle by utilizing transmission system 202. In case of an internal combustion engine, under normal conditions, when brake is not applied, rotational movement of drive shaft 201 may be transferred via transmission system 202 to brake shaft 246. In an exemplary embodiment, normal conditions of a car may refer to a scenario in which the car is running and the brake is not applied. Here, in an exemplary embodiment, rotational movement of brake shaft 246 may urge brake piston assembly 234 to assume a reciprocating motion within brake cylinder 204. As discussed before, in an exemplary embodiment, such reciprocating motion of brake piston assembly 234 may lead to air or oxygen to be continuously drawn into brake cylinder 204 via one-way inlet line 226 and be discharged via one-way outlet line 230. In other words, under normal conditions, brake assembly 200 may function as a turbocharger that sucks in air or oxygen via one-way inlet line 226 and discharges pressurized air or oxygen via one-way outlet line 230 into an exemplary internal combustion engine.

In an exemplary embodiment, when brake is applied, an exemplary controller similar to controller 120 may urge first outlet valve 218 and second outlet valve 222 to be closed, while simultaneously, an exemplary controller may urge an exemplary compressed air system similar to compressed air system to inject pressurized air or oxygen into first chamber 242 and second chamber 244 of brake cylinder 204 via first pressurized fluid line 268 and second pressurized fluid line 270, respectively. This way, in an exemplary embodiment, when brake is applied, the internal pressure of brake cylinder 204 may increase and thereby progressively making the reciprocating motion of brake piston assembly 234 more difficult, which in turn may urge brake shaft 246 to stop rotating. In an exemplary embodiment, such hinderance of rotational motion of brake shaft 246 may be transferred to drive shaft 201 via transmission system 202 and an exemplary vehicle may be stopped. In addition, in an exemplary embodiment, closing first outlet valve 218 and second outlet valve 222 may stop the injection of pressurized air or oxygen into an exemplary internal combustion engine, when the brake is applied. In an exemplary embodiment, this may mean that when brake is applied, brake assembly 200 may further function as a retarder.

Figure 4:
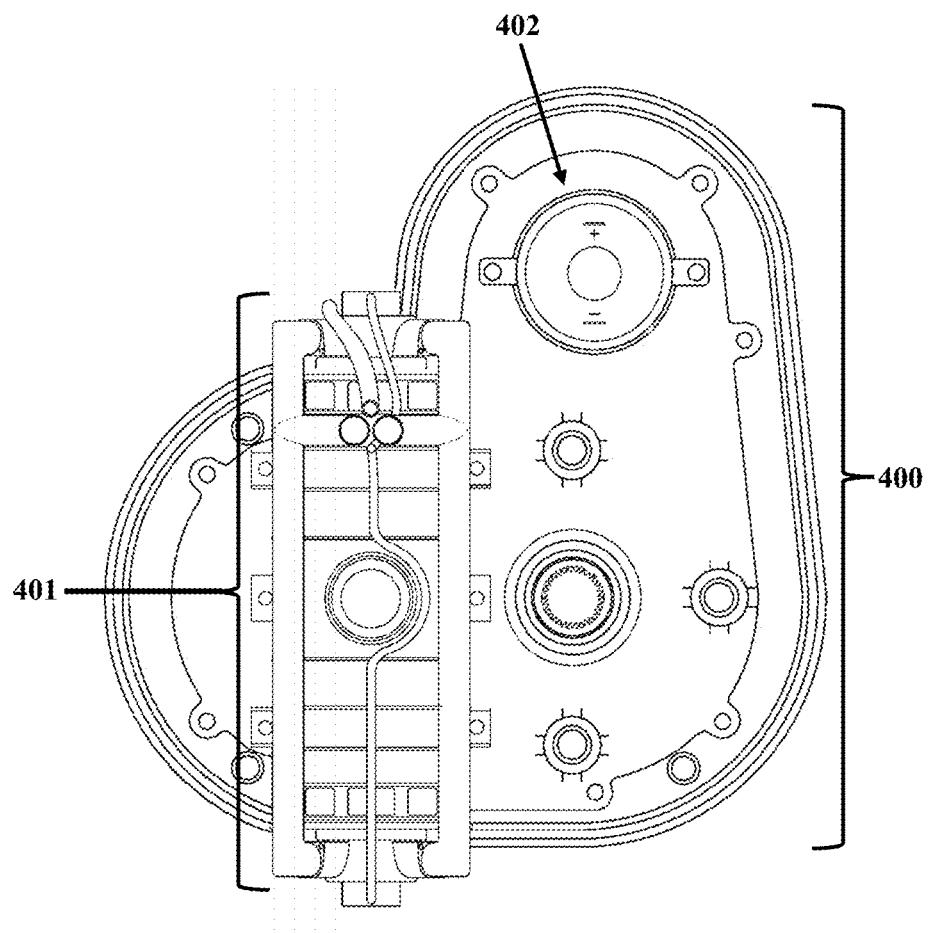
FIG. 4 illustrates a front view of a transmission assembly coupled to a brake assembly in a hybrid or electric vehicle, consistent with one or more exemplary embodiments of the present disclosure.

FIG. 4 illustrates a front view of a transmission assembly 400 coupled to a brake assembly 401 in a hybrid or electric vehicle, consistent with one or more exemplary embodiments of the present disclosure. In an exemplary embodiment, brake assembly 401 may be structurally and functionally similar to brake assembly 200 and may be mounted between an exemplary drive shaft of a hybrid or electric vehicle and an exemplary wheel of a hybrid or electric vehicle by utilizing transmission assembly 400. In an exemplary embodiment, transmission assembly 400 may be configured to engage or disengage brake assembly 401 with an exemplary drive shaft of an exemplary vehicle. In an exemplary embodiment, as brake assembly 401 may be mounted between a drive shaft and w wheel, the transmission assembly 400 may engage brake assembly 401 with the drive shaft. As mentioned before, exemplary electric or hybrid vehicles do not need to be supercharged, consequently, when braking is not required, rotational movement of an exemplary drive shaft of an exemplary electric or hybrid vehicle may be transferred via transmission system 400 to a generator 402 to generate electricity. In an exemplary embodiment, when the brake is applied, transmission system 400 may reconnect an exemplary drive shaft of an exemplary electric or hybrid vehicle to an exemplary brake shaft of brake assembly 401.

In exemplary embodiment, a brake assembly such as brake assembly 200 may be used as a retarder in heavier vehicles, such as trucks to reduce or otherwise control speed in downhill descents. To this end, in an exemplary embodiment, when the brake is applied, the oxygen or air feed to an internal combustion engine connected to one-way outlet line 230 of brake assembly 200 may be shut off by closing first outlet valve 218 and second outlet valve 222.

Figure 5:
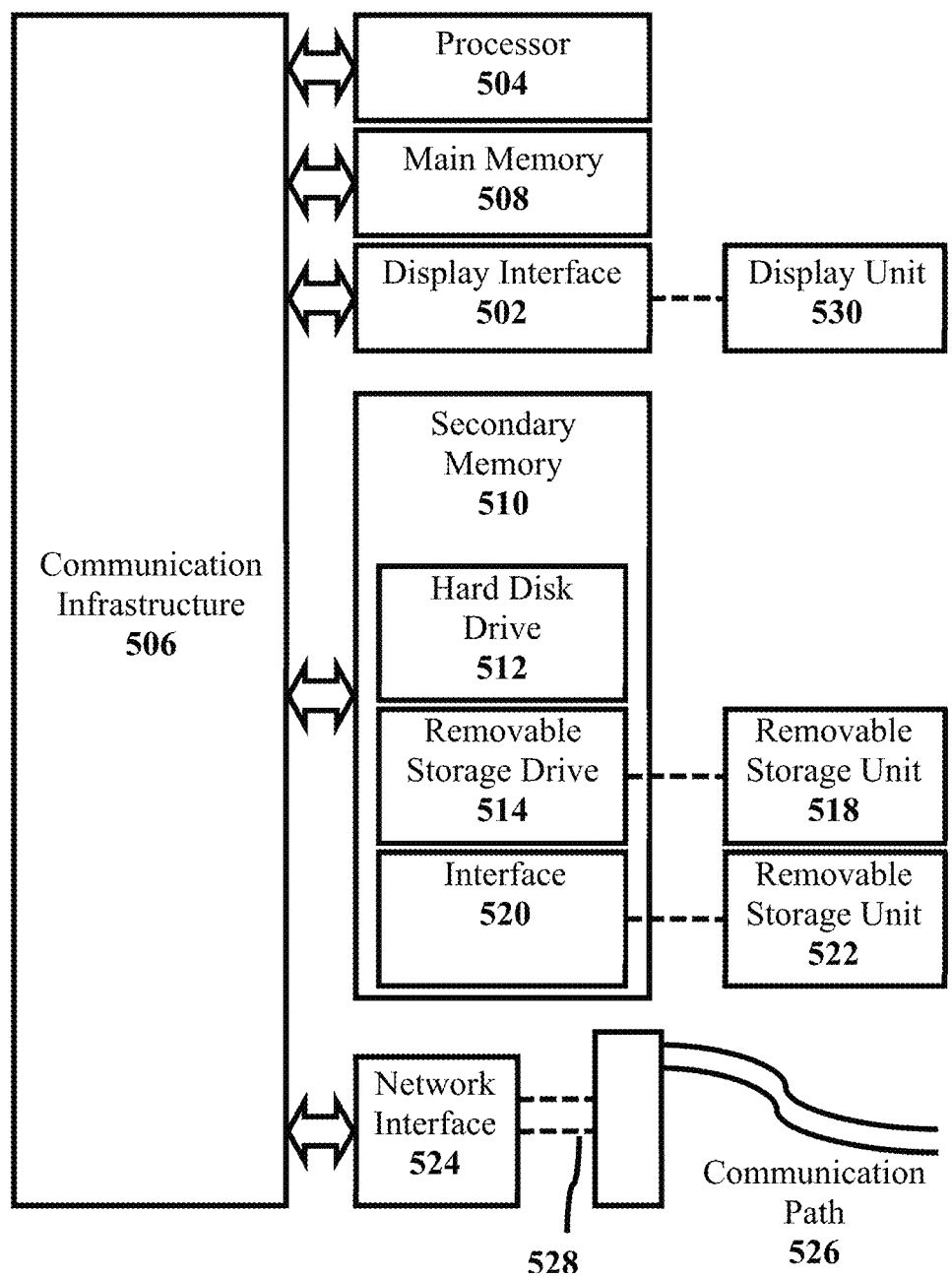
FIG. 5 illustrates an exemplary embodiment of a processing unit, consistent with one or more exemplary embodiments of the present disclosure.

FIG. 5 shows an exemplary embodiment of processing unit 500 in which an exemplary embodiment of the present disclosure, or portions thereof, may be implemented as computer-readable code, consistent with one or more exemplary embodiments of the present disclosure. For example, an exemplary controller similar to controller 120 may be implemented in processing unit 500 using hardware, software, firmware, tangible computer readable media having instructions stored thereon, or a combination thereof and may be implemented in one or more computer systems or other processing systems. In an exemplary embodiment, controller 120 may be similar to processing unit 500 of FIG. 5.

If programmable logic is used, such logic may execute on a commercially available processing platform or a special purpose device. One of ordinary skill in the art may appreciate that an exemplary embodiment of the disclosed subject matter can be practiced with various computer system configurations, including multi-core multiprocessor systems, minicomputers, mainframe computers, computers linked or clustered with distributed functions, as well as microcontrollers, pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An exemplary embodiment of the present disclosure is described in terms of this example processing unit 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. In an exemplary embodiment, processor device 504 may be connected to a communication infrastructure 506, for example, a bus, message queue, network, or multi-core message-passing scheme.

In an exemplary embodiment, processing unit 500 may also include a main memory 508, for example, random access memory (RAM), and may also include a secondary memory 510. In an exemplary embodiment, secondary memory 510 may include a hard disk drive 512, and a removable storage drive 514. In an exemplary embodiment, removable storage drive 514 may include a floppy disk drive, a magnetic tape drive, an optical disk drive, a flash memory, or the like. In addition, removable storage drive 514 may read from and/or write to a removable storage unit 518 in a well-known manner. In an exemplary embodiment, removable storage unit 518 may include a floppy disk, magnetic tape, optical disk, etc., which may be read by and written to by removable storage drive 514. As will be appreciated by persons skilled in the relevant art, removable storage unit 518 may include a computer usable storage medium having stored therein computer software and/or data.

In alternative implementations, secondary memory 510 may include other similar means for allowing computer programs or other instructions to be loaded into processing unit. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from removable storage unit 522 to processing unit 500.

In an exemplary embodiment, processing unit 500 may also include a communications interface 524. Communications interface 524 may allow software and data to be transferred between processing unit 500 and external devices. In an exemplary embodiment, communications interface 524 may include a modem, a network interface (such as an Ethernet card), a communications port, a PCM-CIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. In an exemplary embodiment, communications path 526 may carry signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

In some exemplary embodiment, computer programs (also called computer control logic) may be stored in main memory 508 and/or secondary memory 510. Computer programs may also be received via communications interface 524. Such computer programs, when executed, enable processing unit 500 to implement the present disclosure as discussed herein. In particular, the computer programs, when executed, may enable processor device 504 to implement the processes of the present disclosure. Accordingly, such computer programs represent controllers of processing unit 500. Where the present disclosure is implemented using software, the software may be stored in a computer program product and loaded into processing unit 500 using removable storage drive 514, interface 520, and hard disk drive 512, or communications interface 524.

Embodiments of the present disclosure may also be directed to computer program products including software stored on any computer useable medium. Such software, when executed in one or more data processing devices, causes a data processing device(s) to operate as described herein. An exemplary embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

Moreover, the word "substantially" when used with an adjective or adverb is intended to enhance the scope of the particular characteristic, e.g., substantially planar is intended to mean planar, nearly planar and/or exhibiting characteristics associated with a planar element. Further use of relative terms such as "vertical", "horizontal", "up", "down", and "side-to-side" are used in a relative sense to the normal orientation of the apparatus.

What is claimed is:

1. A braking system, comprising:
an enclosed cylinder;
a double-sided piston assembly comprising:
a first piston disposed within the enclosed cylinder;
a second piston disposed within the enclosed cylinder; and
a linear piston leg connected between and moveable with the first piston and the second piston; the linear piston leg comprising two opposite racks, the double-sided piston assembly configured to divide an inner volume of the enclosed cylinder into a first chamber and a second chamber;
a segmented pinion, the segment pinion rotatable around the segmented pinion's main central axis, the segmented pinion disposed between the two opposite racks, the segmented pinion comprising a cogged segment and a cogless segment, wherein the cogged segment and the cogless segment are on opposite sides of the segmented pinion;
a brake shaft connected to and rotatable with the segmented pinion;
a one-way outlet line connected in fluid communication with the first chamber and the second chamber, the one-way outlet line configured to allow discharging a fluid out of the first chamber and the second chamber;
a one-way inlet line connected in fluid communication with the first chamber and the second chamber, the one-way inlet line configured to allow introducing a fluid into the first chamber and the second chamber; and
a transmission system configured to couple the brake shaft to a drive shaft of a vehicle.

2. The system of claim 1, wherein the two opposite racks are extended along the longitudinal axis of the enclosed cylinder, the two opposite racks laterally spaced apart, the cogged segment of the segmented pinion configured to mesh with only of the two opposite racks at a time responsive to rotational motion of the segmented pinion.

3. The system of claim 2, wherein the segmented pinion is mounted between the two opposite racks such that the cogged segment of the segmented pinion is meshed with one of the two opposite racks and the cogless segment of the segmented pinion faces an opposing one of the two opposite racks during a half turn of the segmented pinion.

4. The system of claim 3, wherein the enclosed cylinder comprises a lateral hole on a wall of the enclosed cylinder, the lateral hole fitted with a bearing rotatably coupled to the brake shaft, the bearing configured to allow the brake shaft to be rotatably coupled to a wall of the enclosed cylinder.

5. The system of claim 4, wherein the enclosed cylinder further comprises:
a first inlet port fitted with a first one-way inlet valve, the first inlet port in fluid communication with the first chamber; and
a second inlet port fitted with a second one-way inlet valve, the second inlet port in fluid communication with the second chamber,
wherein the one-way inlet line is further connected in fluid communication to the first inlet port and the second inlet port.

6. The system of claim 5, wherein the one-way inlet line is connected to a fluid source from one end of the one-way inlet line, and the one-way inlet line is further connected to the first inlet port and the second inlet port from an opposing end of the one-way inlet line.

7. The system of claim 6, wherein the enclosed cylinder further comprises:
a first outlet port fitted with a first one-way outlet valve, the first outlet port in fluid communication with the first chamber; and
a second outlet port fitted with a second one-way outlet valve, the second outlet port in fluid communication with the second chamber,
wherein the one-way outlet line is further connected in fluid communication with the first outlet port and the second outlet port.

8. The system of claim 7, wherein the enclosed cylinder further comprises:
a first pressurized fluid inlet connected in fluid communication with the first chamber, the first pressurized fluid inlet further connected to a pressurized fluid source; and a second pressurized fluid inlet connected in fluid communication with the second chamber, the second pressurized fluid inlet further connected to the pressurized fluid source.

9. The system of claim 8, wherein the pressurized fluid source comprises a fluid pressurizing mechanism connected to a fluid source, the fluid pressurizing mechanism comprising at least one of a fluid pump and a gas compressor.

10. The system of claim 9, further comprising a controller connected in signal communication to the first one-way outlet valve, the second one-way outlet valve, and the fluid pressurizing mechanism, the controller, in response to receiving a brake activating signal, configured to urge the first one-way outlet valve and the second one-way outlet valve to be closed and to urge the fluid pressurizing mechanism to introduce the pressurized fluid into the first chamber and the second chamber via the first pressurized fluid inlet and the second pressurized fluid inlet.

11. The system of claim 9, further comprising a generator coupled to the drive shaft by utilizing the transmission system, the controller further configured to urge the transmission system to engage the drive shaft and the generator when a brake activating signal is not received, and the controller further configured to disengage the drive shaft and the generator in response to receiving a brake activating signal.

12. A brake system, comprising:
a brake cylinder extended along a longitudinal axis of the brake cylinder;
a first valve assembly mounted on a first base end of the brake cylinder, the first valve assembly comprising a first one-way inlet valve and a first one-way outlet valve;
a second valve assembly mounted on an opposite second base end of the brake cylinder, the second valve assembly comprising a second one-way inlet valve and a second one-way outlet valve;
a one-way inlet line connected in fluid communication with the first one-way inlet valve and the second one-way inlet valve;
a one-way outlet line connected in fluid communication with the first one-way outlet valve and the second one-way outlet valve;
a double-sided piston assembly moveably disposed within the brake cylinder, the double-sided piston assembly dividing an inner volume of the brake cylinder into a first chamber and a second chamber, first one-way inlet valve and first one-way outlet valve connected in fluid communication with the first chamber, second one-way inlet valve and second one-way outlet valve connected in fluid communication with the second chamber;
a brake shaft coupled to the double-sided piston assembly, the brake shaft configured to drive a reciprocating motion of the double-sided piston assembly along the longitudinal axis of the brake cylinder;
a first pressurized fluid line connected in fluid communication with the first chamber, the first pressurized fluid inlet further connected to a pressurized fluid source;
a second pressurized fluid line connected in fluid communication with the second chamber; and
a transmission system configured to couple the brake shaft to a drive shaft of a vehicle.

13. The brake system of claim 12, wherein the double-sided piston assembly comprises:

a first piston;
a second piston; and
an elongated linear piston leg attached between the first piston and the second piston, the elongated linear piston leg comprising a frame with two opposing linear cogged sections, the two opposing linear cogged sections extended along the longitudinal axis of the brake cylinder, two opposing linear cogged sections symmetrically spaced apart along an axis perpendicular to the longitudinal axis of the brake cylinder.

14. The brake system of claim 13, further comprises a segmented pinion coupled to and rotatable with the brake shaft, the segmented pinion comprising:
a cogged segment peripherally formed on an outer surface of the segmented pinion, the cogged segment extended peripherally up to one-half of the external surface of the segmented pinion; and
a cogless segment on an opposite half of the segmented pinion with respect to the cogged segment,
wherein the segmented pinion is disposed between the two opposing linear cogged sections of the elongated linear piston leg, the segmented pinion configured to alternately mesh with either one of the two opposing linear cogged sections of the elongated linear piston leg responsive to the brake shaft rotating the segmented pinion.

15. The system of claim 14, wherein the brake cylinder comprises a lateral hole on a wall of the brake cylinder, the lateral hole fitted with a bearing rotatably coupled to the brake shaft, the bearing configured to allow the brake shaft to be rotatably coupled to a wall of the brake cylinder.

16. The system of claim 15, wherein the one-way inlet line is connected to a fluid source from one end of the one-way inlet line, and the one-way inlet line is further connected to the first inlet port and the second inlet port from an opposing end of the one-way inlet line.

17. The system of claim 16, wherein the pressurized fluid source comprises a fluid pressurizing mechanism connected to a fluid source, the fluid pressurizing mechanism comprising at least one of a fluid pump and a gas compressor.

18. The system of claim 17, further comprising a controller connected in signal communication to the first one-way outlet valve, the second one-way outlet valve, and the fluid pressurizing mechanism, the controller, in response to receiving a brake activating signal, configured to urge the first one-way outlet valve and the second one-way outlet valve to be closed and to urge the fluid pressurizing mechanism to introduce the pressurized fluid into the first chamber and the second chamber via the first pressurized fluid inlet and the second pressurized fluid inlet.

19. The system of claim 18, wherein the pressurized fluid comprises at least one of pressurized air and pressurized oxygen.

20. The system of claim 19, further comprising a generator coupled to the drive shaft by utilizing the transmission system, the controller further configured to urge the transmission system to engage the drive shaft and the generator when a brake activating signal is not received, and the controller further configured to disengage the drive shaft and the generator in response to receiving a brake activating signal.

* * * * *